UNITED STATES PATENT OFFICE.

CAMILLE EMILE DÉSIRÉ WINSSINGER, OF BRUSSELS, BELGIUM.

PROCESS OF MAKING BICALCIC PHOSPHATE.

SPECIFICATION forming part of Letters Patent No. 418,259, dated December 31, 1889.

Application filed January 10, 1889. Serial No. 296,010. (Specimens.) Patented in Belgium September 8, 1888, No. 83,199.

*To all whom it may concern:*

Be it known that I, CAMILLE EMILE DÉSIRÉ WINSSINGER, a citizen of the Kingdom of Belgium, residing at Brussels, Belgium, have invented certain new and useful Improvements in the Manufacture of Bicalcareous Phosphate, called Precipitated Phosphate, (for which I have obtained Letters Patent in Belgium, No. 83, 199, dated September 8, 1888;) and I do hereby declare the following to be a full, clear, and exact description of the invention, such as will enable others skilled in the art to which it appertains to make and use the same.

My invention relates to the production of bicalcic phosphate, so-called "precipitated phosphate;" and it consists in a novel process of producing the same and, incidental to the process, of producing certain by-products, substantially as hereinafter described, and as set forth in the claims.

The primary object of my invention is to produce on a commercial scale what is called "precipitated phosphate" or the bicalcic phosphate formula according to atomic theory, $CaHPO_4 + 2H_2O$, and according to dualistic formula $2CaOH_2OP_2O_5 + 4aq.$, of a standard of about forty per cent. of anhydrous acid free from metallic oxides—such as oxide of iron, alumina, &c.—and that is soluble in basic citrate of ammonia—*i. e.*, in ammoniacal ammonic citrate.

The invention further contemplates, as incidental to the process of obtaining bicalcic phosphate, the obtaining of by-products, such as sulphate of lime and caustic soda.

The further object of the invention is to obtain the above products from any phosphate of lime, whether natural or artificial, raw or enriched, or from phosphatic substances or materials, such as bone-ashes, phosphorites, phosphates from the Mons Basin, the mineral known in France and Belgium as "craie grise," phosphates from the "Somme," from Canada—in fact, from any substance containing lime and phosphoric anhydride, or containing such together with other substances like calcic carbonate, silica, clay, oxide of iron or of aluminium, magnesia, &c. The bicalcic phosphate is distinguished from the tricalcic phosphate in that the former is and the latter is not soluble in basic citrate of ammonia, and, as is well known, the value of phosphated fertilizers depends upon the proportion of soluble phosphates they contain, which solubility is generally tested with a basic citrate of ammonia. The latter may readily be obtained by adding four hundred grams of crystallized citric acid to a sufficient quantity of an aqueous solution of ammonia of a density of about 0.92 to obtain a liter of solution, which is very basic and decomposes the bicalcic phosphate, the elements thereof entering into solutions into the excess of citrate of ammonia.

In order that my invention may be more fully understood, I will describe the same step by step in regular order, as follows:

First. The phosphatic material or phosphate is treated in a slight excess of sulphuric acid of from 50° to 53° Baumé, and the quantity of acid will depend upon the nature of the material treated, and is determined by analysis, in order to convert all of the bases—such as lime, oxide of iron, or alumina—into sulphates. Generally speaking, for each molecule of $Ca_3(PO_4)_2$ about $3H_2SO_4$ is required plus from one to two per centum of the quantity determined as an excess. The result of this treatment is a dry mass that is converted into a semi-liquid by dilution with water and the liquid eliminated by filtration in a filter-press. The liquid obtained is an impure aqueous solution of phosphoric acid, while the solid residue is an impure sulphate of lime. This liquor, here called "impure aqueous solution of phosphoric acid," contains water, phosphoric acid, sulphuric acid, lime, oxide of iron and of alumina, combined with the acid. As to the other ingredients or chemicals employed in the process, as hereinafter described, there is no necessity of measuring or weighing the same, as these are added in such quantities as to be in excess, and this may readily be ascertained by means which I will specify in each of the steps of the process.

Secondly. To the impure aqueous solution of phosphoric acid obtained as described under "first" I add an excess of carbonate of lime in powder to precipitate all of the iron, &c. The reaction that takes place is as follows: The carbonate of lime is first decomposed by the free acids, and $CaSO_4$ (calcic sulphate) and $CaH_4(PO_4)_2$ (soluble monocalcic phosphate) are formed. If the action of the carbonate of lime is allowed to continue, the salts of iron and alumina are next decomposed and their bases are precipitated from the monocalcic solution in the form of insoluble phosphates. As a test in ascertaining whether the solution is free from iron and alumina or not, ferro-cyanide of potassium is added to a portion of the filtered solution, the presence of iron being indicated in a well-known manner. The compound so obtained, when subjected to filtration under pressure, as in a filter-press, yields a liquid generally of a yellow color, composed, essentially, of monocalcic phosphate. The solid residue consists of the precipitated phosphate of iron and alumina, as well as sulphate of lime and the excess of the carbonate of lime. This yellow color of the solution is due principally to organic matter present in the material treated. Instead of carbonate of lime, lime in powder or a milk of lime may be employed; or the carbonate of lime may be added to the solution until the iron, &c., commences to precipitate, and then milk of lime may be added to complete the precipitation, or until the ferro-cyanide of potassium test shows that the solution is free from iron. The precipitation with carbonate of lime is preferable simply because the completion of the process can be more readily ascertained, while with lime greater precautions are necessary in order not to use it in too great an excess, which would result in the useless precipitation of bi and tri calcic phosphates, that would impoverish the yellow liquor. The above-described operations may be carried on in any suitable apparatus provided with agitators or stirrers.

If it is desired to obtain sulphate of lime as a by-product, I proceed as follows:

Thirdly. The solid residues resulting from the filtration in the process, as described under "secondly," are treated with the impure aqueous solution of phosphoric acid obtained as described under "first," to again dissolve all the bases with the exception of the major portion of the sulphate of lime, and as the appearance of this sulphate is entirely different from that contained in the residue before treatment, in that it is much more granular, it can be readily determined whether the quantity of phosphoric-acid solution employed is sufficient. As a general rule I may state that the quantity of phosphoric-acid solution here employed will be about the same as the quantity employed as described under "secondly," and from which the residue here in question has been obtained. The compound is then subjected to filtration under pressure, the residue obtained being sulphate of lime, while the liquor contains phosphoric acid, oxide of iron and alumina, and a little sulphate of lime in solution. The phosphoric acid is present in the liquor in three forms: first, as a free acid; second, in the form of acid phosphate of lime, ($CaH_4(PO_4)_2$,) and, third, in combination with the oxide of iron and alumina. To this liquor I add a little milk of lime to reduce the quantity of free phosphoric acid and increase the quantity of monocalcic phosphate. The addition of the milk of lime should, however, cease as soon as precipitation sets in and solution ceases. The liquid is now ready for the next operation.

If it is desired to obtain caustic soda as a by-product, I proceed as follows:

Fourthly. Sulphate of soda is added to the liquid last referred to and the whole heated. The sulphate of soda is added gradually and so long as sulphate of lime is formed. An excess of sulphate of soda is thus employed, but is not detrimental. After a short ebullition the solution is filtered, the residue being sulphate of lime and the liquor a solution of monosodic phosphate, ($NaH_2PO_4$,) yet containing all the iron and alumina, as well as the excess of sulphate of soda. The formation of the sulphate of lime is due to an excess of sulphuric acid in the phosphoric-acid solution employed.

Fifthly. To the monosodic-sulphate solution obtained under "fourthly" I add pulverized carbonate of soda, or an aqueous solution of such, in sufficient quantity to remove all the iron therefrom by precipitation. The carbonate of soda dissolves under evolution of carbonic acid, the monosodic phosphate being converted into bisodic phosphate, ($Na_2HPO_4$,) while the oxides of iron and alumina are precipitated in the form of phosphates. This precipitate, containing all the iron and alumina, is separated by filtration, washed and dried, and may be sold as a second-grade phosphate fertilizer. The liquor obtained under "fifthly" is a neutral bisodic-phosphate solution almost chemically pure, containing, perhaps, a slight excess of sodic carbonate.

Sixthly. To the cold bisodic-phosphate solution I add milk of lime under agitation and gradually until the whole of the phosphoric acid is precipitated. The completion of the elimination of the phosphoric acid may be readily ascertained by the addition of calcium chloride to a portion of the filtered liquor, which, so long as phosphoric acid is present, will become turbid. I next filter the solution, the solid residue being a mixture of tricalcic phosphate and lime, $Ca_3(PO_4)_2 + nCaH_2O_2$, the formula of which in practice is usually $n=1$ to 1, 5, and the liquor a solution of caustic soda.

Seventhly. I now treat the tricalcic phosphate of lime with an excess of the yellow monocalcic solution obtained as described under "secondly" and filter off the liquid. By this means I convert the basic phosphate into bicalcic phosphate, the reaction taking place according to the following formula:

$$Ca_3(PO_4)_2 + CaH_4(PO_4)_2 + aq. = 4CaHPO_4 + aq.$$
$$CaH_2O_2 + CaH_4(PO_4)_2 + aq. = 2CaHPO_4 + aq.$$

The solid residue of filtration is dried at as low temperature as possible, and constitutes the bicalcic phosphate soluble in basic citrate of ammonia, (ammoniacal ammonic citrate.)

Instead of making use of the solid residue obtained as described under "secondly" and treated as described under "thirdly," it may be thrown away as refuse or sold as a fertilizer, in which case the yellowish aqueous monocalcic-phosphate solution obtained as described under "secondly" is treated with sulphate of soda as described under "fourthly," and then proceed as described under "fifthly," "sixthly," and "seventhly."

Finally, if it is desired not to obtain the caustic soda as a by-product, the monocalcic-phosphate solution may be treated with pulverized lime or milk of lime, or with precipitated tricalcic phosphate, or a mixture of the two, bicalcic phosphate sufficiently pure for commercial purposes being also obtained.

Having described my invention, what I claim is—

1. In the production of bicalcic phosphates soluble in basic citrate of ammonia, the herein-described process of producing a mother-liquor or solution of monocalcic phosphate of lime, which consists, first, in forming a phosphoric-acid solution by treating a phosphate or a phosphatic material such as described with an excess of sulphuric acid and separating the liquid by filtration, and, secondly, in converting the phosphoric-acid solution so obtained into a monocalcic-phosphate solution free from iron, &c., by treatment with carbonate of lime or a milk of lime, or both, as described.

2. In the process of obtaining bicalcic phosphate of lime, the process of obtaining sulphate of lime as a by-product which consists in first preparing an aqueous solution of phosphoric acid, as set forth, and treating the solution with a calcium salt or calcium compound, or a combination of such, separating the solid from the liquid, and treating such solid residue again with a phosphoric-acid solution and separating the sulphate of lime produced by the reaction, substantially as set forth.

3. The process of obtaining bicalcic phosphate of lime, and obtaining caustic soda as a by-product, which consists in first preparing an aqueous solution of phosphoric acid, as set forth, treating the same with a calcium salt or calcium compound, or a combination of such, separating the monocalcic solution so obtained from the solid residue, and converting said monocalcic solution into a monosodic solution by treatment with sulphate of soda, treating the monosodic-phosphate solution with carbonate of soda, treating the resulting neutral solution with lime, separating the phosphate of lime from the resulting solution of caustic soda, treating the separated phosphate with an aqueous monocalcic solution obtained as set forth, and separating the bicalcic phosphate, as specified.

In testimony whereof I affix my signature in presence of two witnesses.

CAMILLE EMILE DÉSIRÉ WINSSINGER.

Witnesses:
 HENRI RAELOT,
 EDOUARD LABORQUE.